Feb. 9, 1943.  R. E. SCHOCK  2,310,260
WAVE LENGTH MODULATION.
Filed July 18, 1940  6 Sheets-Sheet 1
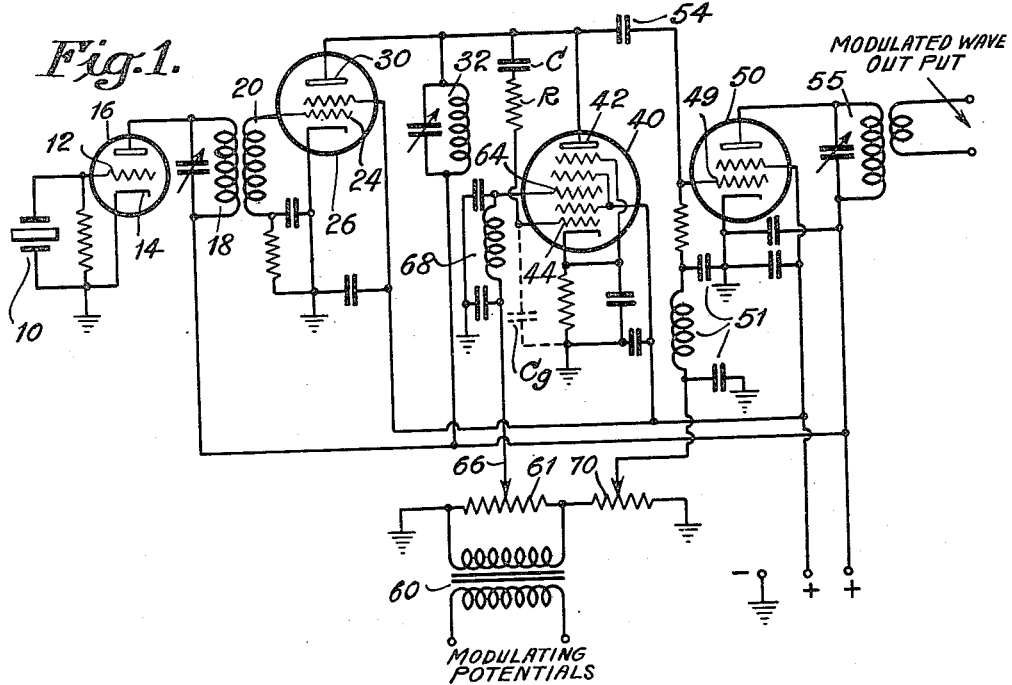
Fig.1.
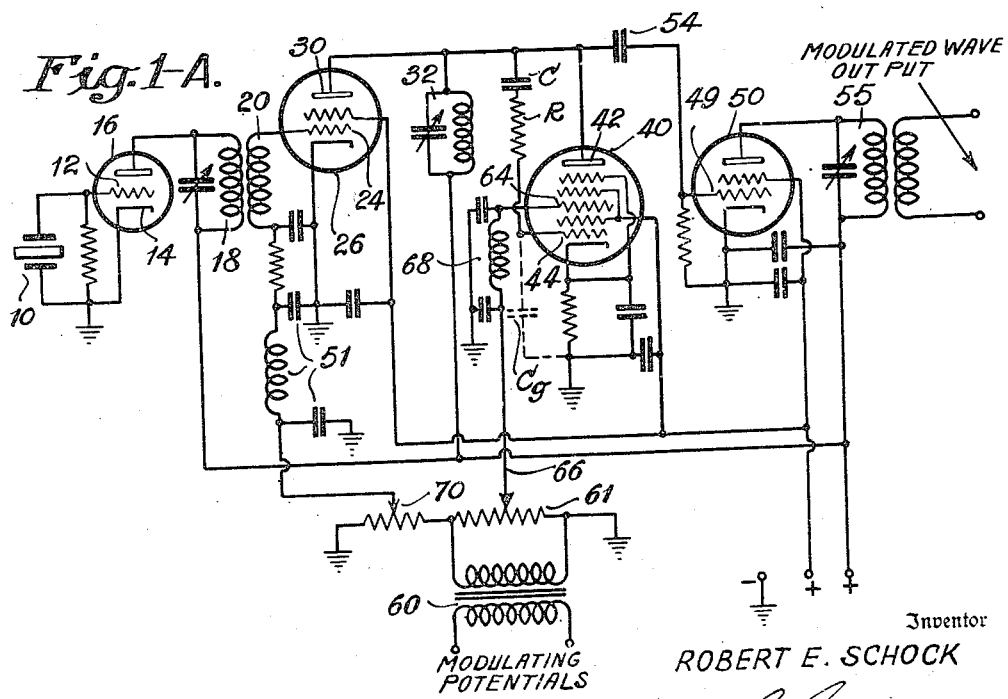
Fig.1-A.
Inventor
ROBERT E. SCHOCK
By H. S. Grover
Attorney

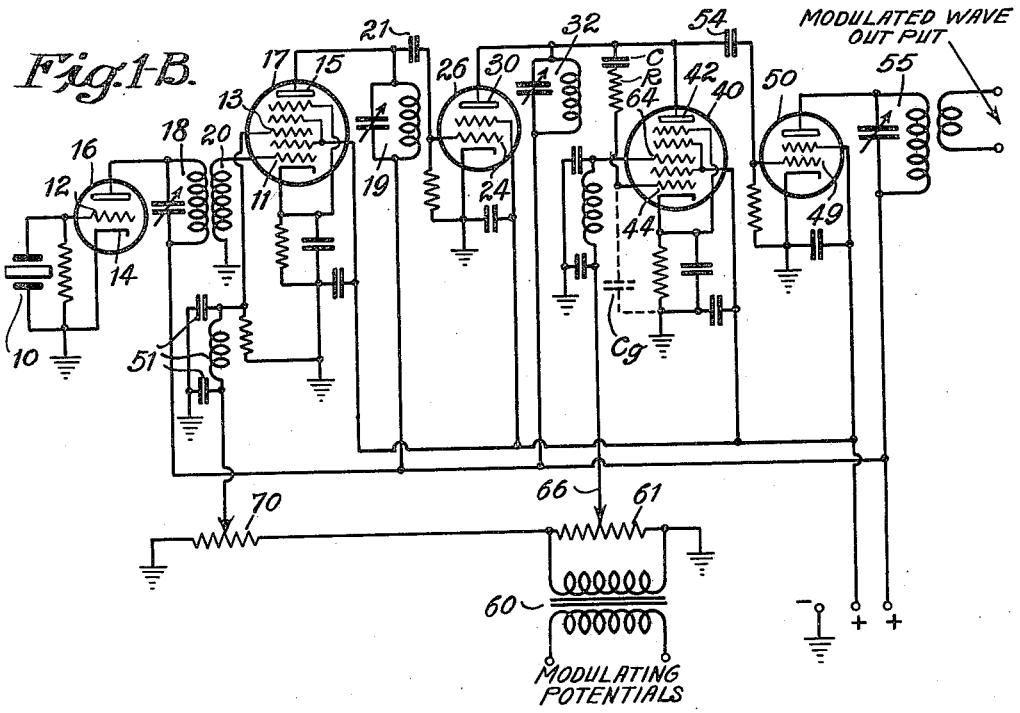
Fig. 1-B.
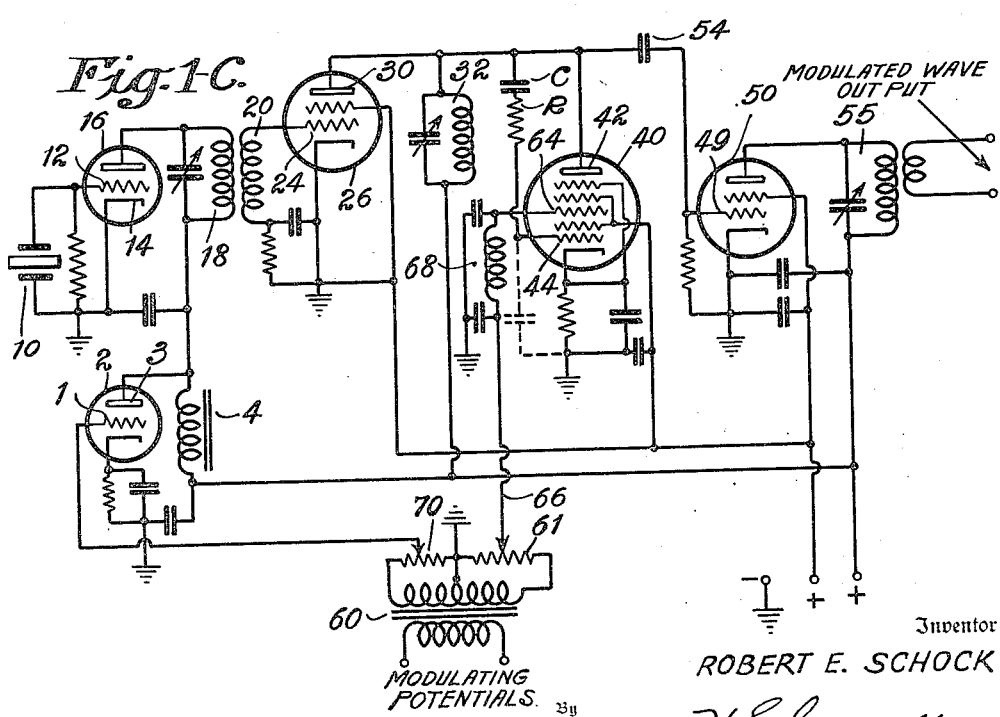
Fig. 1-C.
Inventor
ROBERT E. SCHOCK
H. S. Grover
Attorney

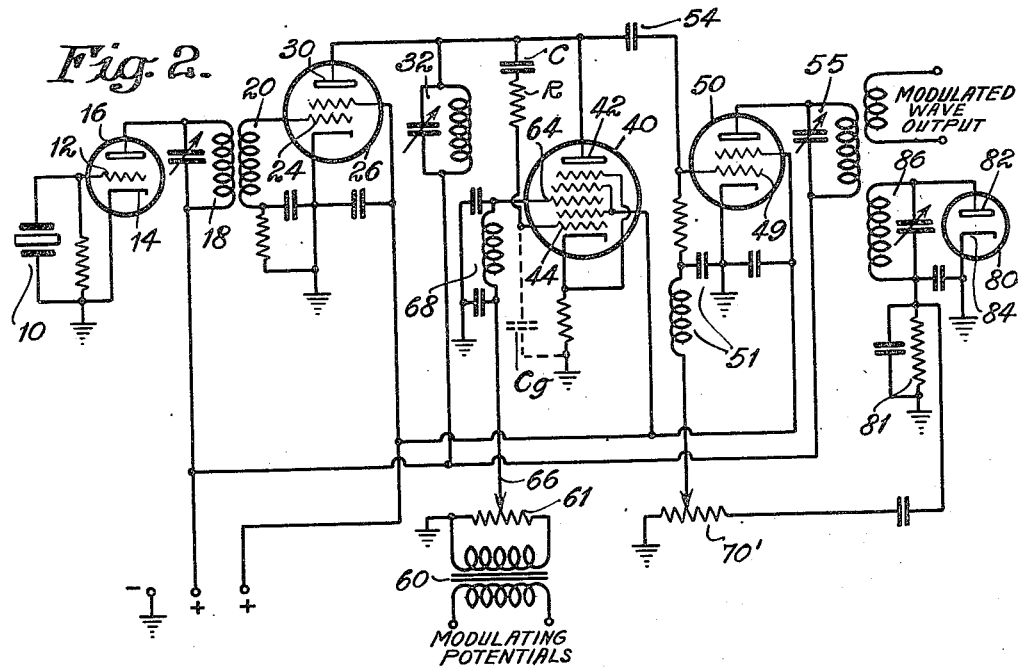

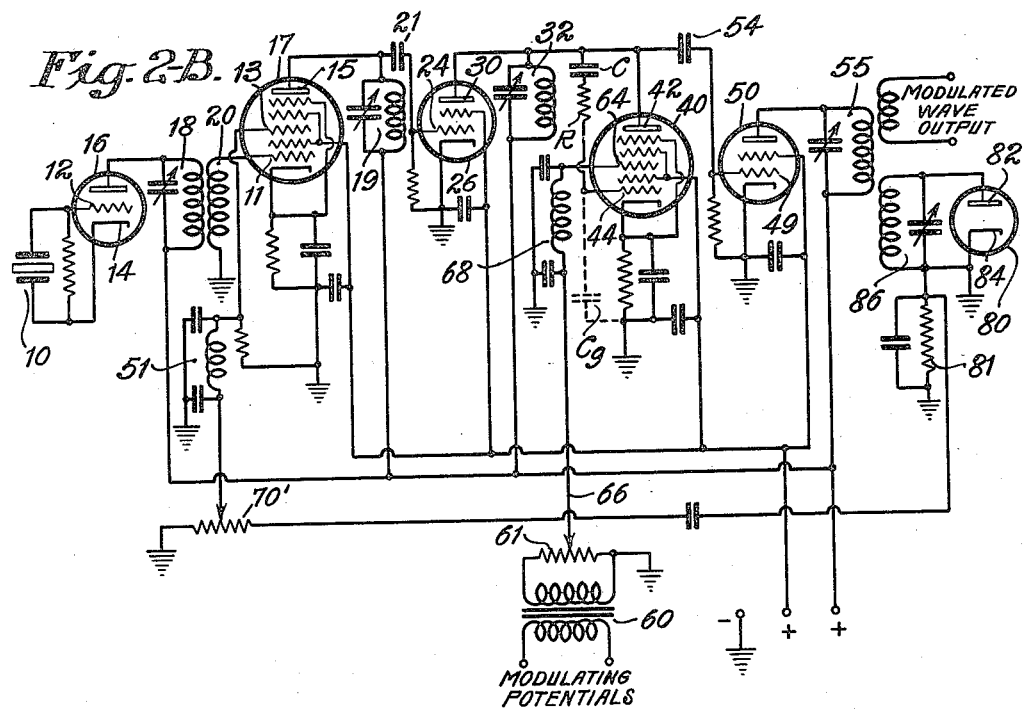
Fig. 2-B.
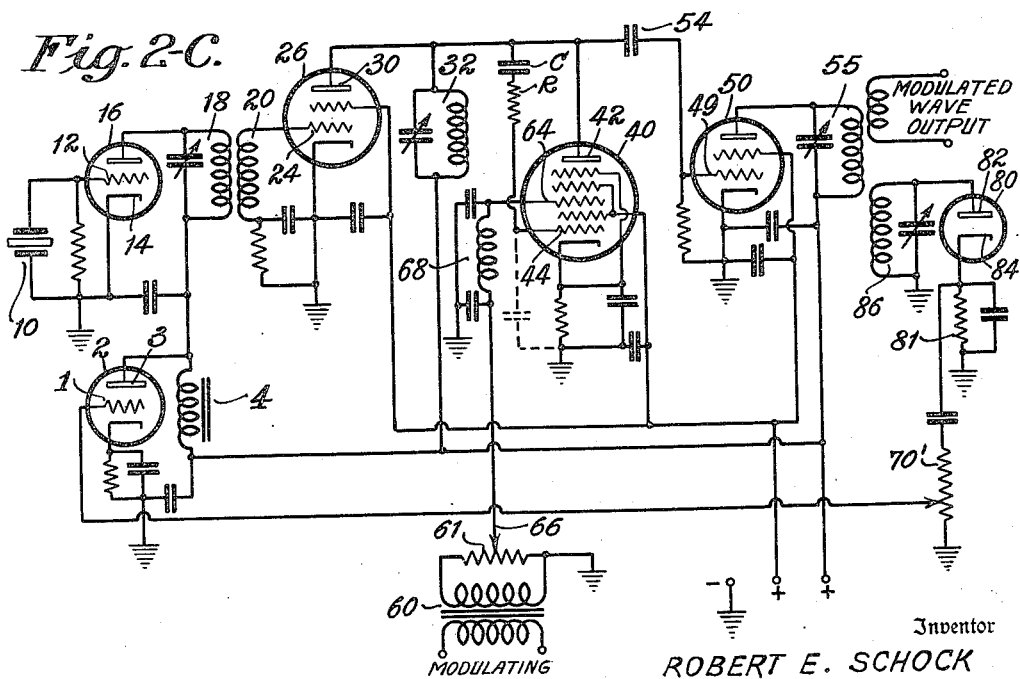
Fig. 2-C.
Inventor
ROBERT E. SCHOCK
H. S. Grover
Attorney Feb. 9, 1943. R. E. SCHOCK 2,310,260
WAVE LENGTH MODULATION
Filed July 18, 1940 6 Sheets-Sheet 5
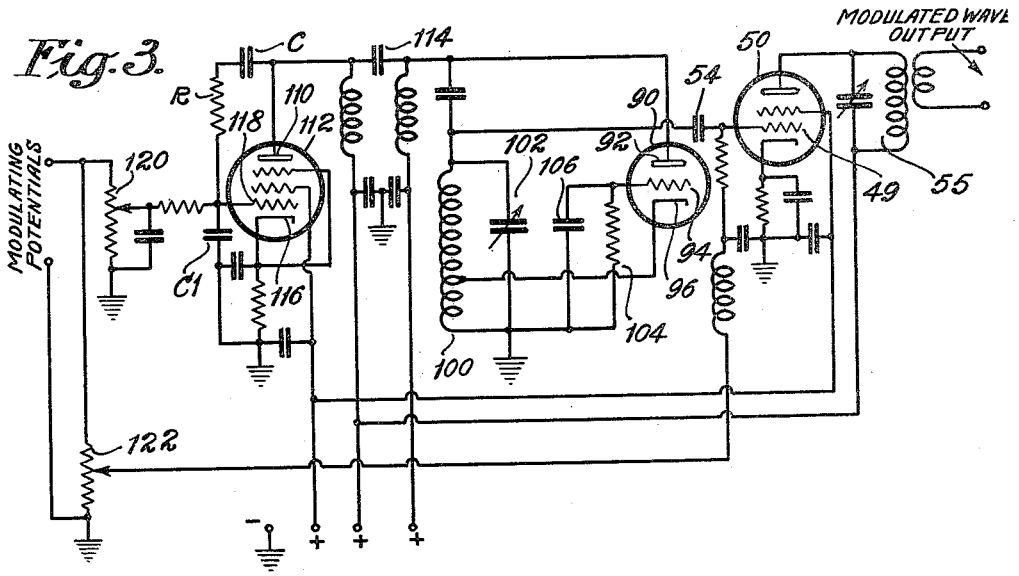
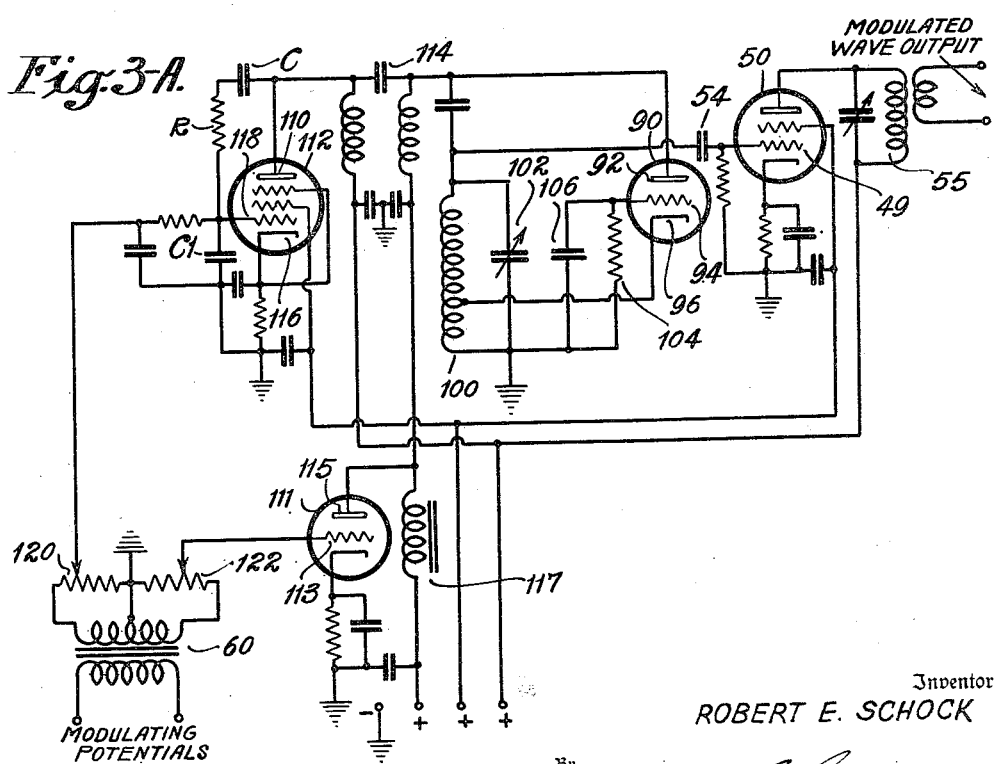
Inventor
ROBERT E. SCHOCK
By H. G. Grover
Attorney Feb. 9, 1943. R. E. SCHOCK 2,310,260
WAVE LENGTH MODULATION
Filed July 18, 1940 6 Sheets-Sheet 6
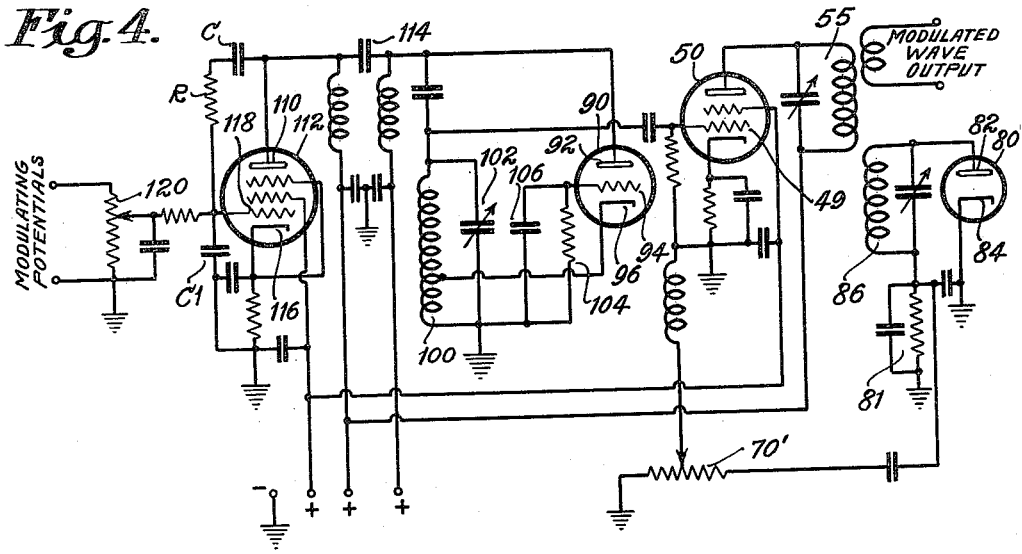
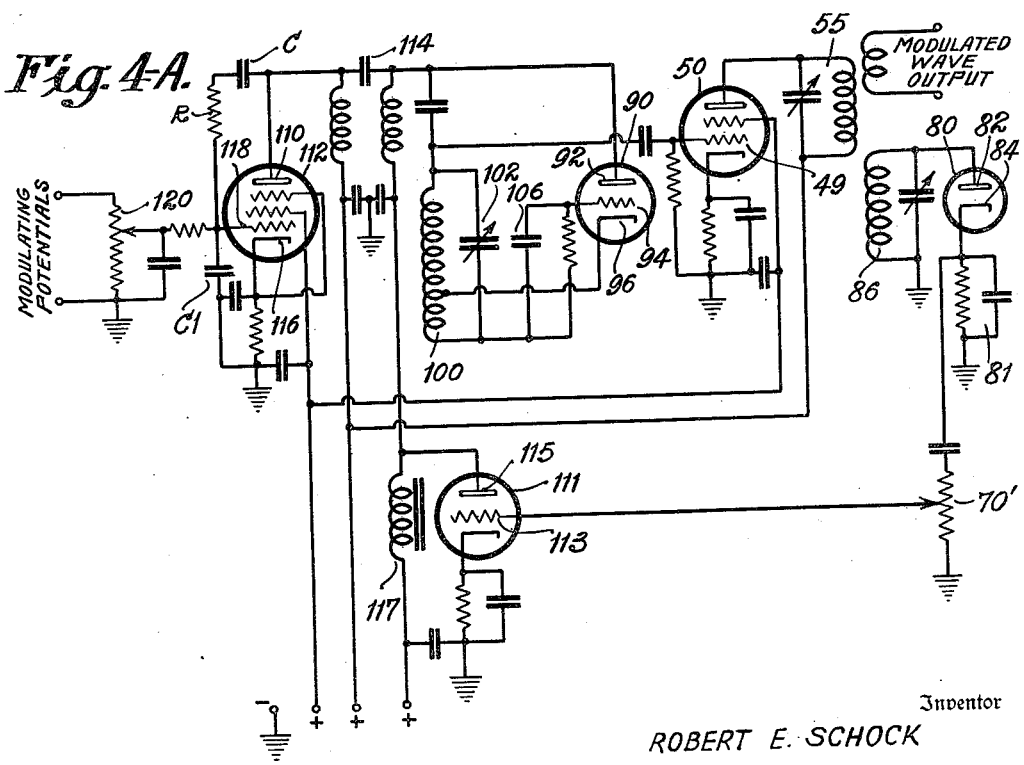
Inventor
ROBERT E. SCHOCK
By H.S. Grover
Attorney Patented Feb. 9, 1943

2,310,260

UNITED STATES PATENT OFFICE 2,310,260

WAVE LENGTH MODULATION

Robert E. Schock, Riverhead, N. Y., assignor to Radio Corporation of America, a corporation of Delaware Application July 18, 1940, Serial No. 346,079

7 Claims. (Cl. 179—171.5)

This application describes a method of and means for balancing out the amplitude modulation which is often impressed on a carrier wave at the time it is being frequency modulated or phase modulated.

In describing my invention, reference will be made to the attached drawings wherein:

Figs. 1, 1A, 1B, 1C, 2, 2A, 2B, 2C, 3, 3A, 4 and 4A each illustrate a wave length modulator with wave amplitude modulation compensating means. The wave length modulators of Figs. 1, 1A, 1B, 1C, 2, 2A, 2B and 2C phase modulate the wave while those of Figs. 3, 3A, 4 and 4A frequency modulate the waves.

An arrangement of a novel circuit to produce phase modulation of wave energy and at the same time correct inherent amplitude modulation thereof will now be described.

In Fig. 1, 10 is a crystal connected between the grid 12 and cathode 14 of a tube 16 to produce in said tube 16 and the circuit 18 in a well known manner oscillations of a substantially constant frequency. The frequency of the produced oscillations is determined by the crystal dimensions and the constants of the circuit elements. The plate circuit 18 tuned to the crystal frequency feeds through coupling coil 20 to the control grid 24 of a frequency doubler tube 26 which has its plate 30 connected to a tuned circuit 32. Tube 26 may be of any appropriate type tube, a screen grid type being shown. The tuned circuit 32 is tuned to double the oscillator frequency. 40 is a reactance tube having its anode 42 coupled to the anode 30 of tube 26. The cathodes of tubes 26 and 40 are connected to ground so that the plate circuits of these tubes are in parallel. The grid 44 of reactance tube 42 is coupled to a point on the phase shifting circuit comprising condenser C and resistance R and the grid to cathode capacity Cg. The high frequency voltages on the grid 44 and anode 42 are substantially in phase quadrature. The tube 40 is a modulated reactance tube and the nature and operation thereof is known in the radio art. See for example Crosby United States application No. 136,578 filed April 13, 1937.

A second frequency doubler tube 50 is coupled to the first doubler tube 26 through blocking condenser 54 and has its plate circuit 55 tuned to four times the oscillator frequency. A transformer 60 is excited by controlling potentials of any nature such as voice frequency potentials or picture frequency potentials. These potentials are supplied to resistance 61 and thence to a modulator grid 64 of reactance tube 40 through a lead 66 tapped on potentiometer resistance 61 and low pass filter 68. Another potentiometer resistance 70 in parallel with potentiometer 61 is connected to the grid 49 of frequency multiplier tube 50 through a radio-frequency filter 51 and thereby supplies an adjustable modulation voltage from transformer 60 to the control grid 49 of multiplier tube 50, for the purpose of balancing out amplitude modulation.

The potentiometer resistance 70 being in parallel with potentiometer 61 supplies voltage to grid 49 of multiplier tube 50 of the same phase and polarity as that supplied by potentiometer 61 to the grid 64 of reactance tube 40. The modulating voltages on grids 64 and 49 of tubes 40 and 50 respectively are thus in proper phase and polarity relationship to effect the desired compensation according to the requirements for proper operation.

In operation, phase modulation of the signal in the plate circuit 32 of doubler tube 26 results when a modulating voltage from transformer 60 is applied to the grid 64 of reactance tube 40. However, it has also been found that at the instant the modulating voltage is of such polarity as to increase the conductance of the reactance tube 40, the amplitude of the output of doubler tube 26 is decreased. When the modulating voltage polarity reverses so as to decrease the conductance of the reactance tube 40, the wave amplitude in the plate of doubler tube 26 increases. Thus, amplitude modulation is introduced. This amplitude modulation is compensated for or removed by the introduction of modulation voltage of correct amount and polarity from transformer 60 through potentiometer 70 to the control grid 49 of doubler tube 50. If the polarity of the modulating voltage fed to the grid 49 of doubler tube 50 is the same as that fed to the modulator grid 64 of reactance tube 40 the conductance of the doubler tube 50 will increase at the same time the amplitude of the signal from tube 26 is being lowered by the reactance tube action. By proper adjustment of potentiometer 70 this change in conductance of tube 50 may be made such that it changes the amplitude of the wave, fed through it, enough to compensate for the action of the reactance tube 40 on the amplitude of the wave being modulated in length.

Fig. 1A shows a modification of Fig. 1 wherein the compensating modulation is introduced on grid 24 of frequency doubler tube 26 instead of grid 49 of doubler tube 50. This system operates the same as the system of Fig. 1.

The circuit of Fig. 1B is a modification of Fig.

1 wherein the compensating modulation is introduced on grid 13 of an amplifier tube 17 which is placed between oscillator tube 16 and doubler tube 26. The oscillator signal is fed by coupling coil 20 to grid 11 of amplifier tube 17 which has as its plate impedance a tuned circuit 19, tuned to the frequency of the oscillator signal and which is coupled by blocking condenser 21 to grid 24 of frequency doubler tube 26.

Another variation of the circuit of Fig. 1 is shown in Fig. 1C wherein the compensating modulation is introduced by way of a plate modulator tube 2, to the plate circuit of oscillator tube 16. In this case the modulation input transformer 60 has a push-pull output winding one side of which feeds modulating potentials for phase modulating purposes through contact arm 66 of potentiometer 51 to grid 64 of reactance tube 40, while the other side feeds modulating potentials, for the purpose of amplitude modulation compensation, to grid 1 of plate modulator tube 2 and 180 degrees out of phase with the modulating potential on grid 64 of the phase modulator tube 40. This modulating potential on the grid of plate modulator tube 2 controls it to function through its plate reactance 4 to modulate the voltage supply of oscillator tube 16 so that its amplitude of oscillation (and therefore of output) is modulated in phase opposition to the amplitude modulation introduced by reactance tube 40, thereby compensating for it.

The circuit of Fig. 2 is a modification of that of Fig. 1. It is similar to the circuit of Fig. 1 except in the manner of obtaining audio voltage at the control grid 49 of frequency doubler tube 50 for the purpose of balancing out amplitude modulation. In Fig. 2, a diode rectifier comprising a tube 80 has an anode 82 and cathode 84 connected to a tuned circuit 86. The cathode 84 is connected to the anode 82 also by means of a resistance 81. The circuit 86 is transformer-coupled to the output circuit 55 of doubler tube 50 by coupling between the inductance of circuit 55 and the inductance of circuit 86. In operation, the amplitude modulation on the signal thus fed to detector tube 80 is detected and fed to potentiometer 70' which feeds this balancing voltage to the grid 49 of doubler tube 50.

The arrangement of Fig. 2 can be modified as shown in Fig. 2A to apply the compensating potential to the grid 24 of the doubler tube 26 instead of to the grid 49 of the doubler tube 50. The arrangement of Fig. 2 has been modified in Fig. 2A in substantially the same manner in which Fig. 1 has been modified in Fig. 1A.

In Fig. 2B, the potentials for compensating the undesired amplitude modulation are supplied from the resistance 81 in the circuit of rectifier 80 to potentiometer 70' and thence to the grid 13 of an amplifier tube 17. The circuit of Fig. 2 has been modified in Fig. 2B in much the same manner in which the circuit of Fig. 1 is modified in Fig. 1B.

In Fig. 2C, the compensating component of the rectified modulated wave is supplied from potentiometer 70' to the grid 1 of potential amplifier tube 2 and controls this tube. This tube 2 has its anode connected to the plate supply for tube 16 so that anode modulation takes place in tube 16.

The method and means of my invention may be applied to a frequency modulator such as illustrated in Fig. 3. In this circuit tube 90 is an oscillator tube having its anode 92, grid 94 and cathode 96 coupled in regenerative circuits comprising an inductance 100, a variable capacity 102 and a resistance 104 shunted by a condenser 106. The elements 100 and 102 comprise the tank circuit and the elements 104 and 106 comprise the condenser and grid leak of a Hartley oscillator circuit. The radio-frequency plate circuit of the oscillator is coupled to the anode 110 of a reactance modulator tube 112, through blocking condenser 114. The anode 110 of the reactance tube is coupled to the cathode 116 by a condenser C, resistance R and a second condenser C1. The grid 118 is connected to a point on this phase shifting circuit to be excited by a voltage displaced in phase by about 90 degrees relative to the radio-frequency voltage on plate 92 of the oscillator tube 90.

The oscillator feeds an amplifier tube 50 by way of a coupling and blocking condenser 54 as in the prior modifications and the plate circuit 55 of tube 50 is, in this case, tuned to the oscillator frequency.

Potentiometer 120 is a means of controlling the modulation input voltage to the reactance modulator tube 112 and potentiometer 122 is a means of controlling the amount of modulation voltage fed to the control grid 49 of amplifier tube 50 for the purpose of producing amplitude modulation and thereby removing undesired amplitude modulation which is introduced on the signal during the frequency modulating process.

In operation, a modulating voltage impressed on the control grid 118 of tube 112, Fig. 3, causes modulation of the frequency of the oscillator including tube 90. It has also been found that when the conductance of the reactance tube 112 is increased by any instantaneous value of modulating voltage, the oscillator output is at the same instant somewhat diminished and vice versa. If, at the same instant, a portion of the modulation voltage—same polarity—is fed to the control grid 49 of amplifier tube 50 from potentiometer 122 as shown in Fig. 3, the gain of this amplifier will increase when the oscillator output is decreasing and vice versa. The amount of this change of gain may be so adjusted that complete compensation is made for the amplitude modulation present.

In Fig. 3a, the compensating modulation voltage is supplied from a transformer 60 to the two potentiometers 120 and 122. Modulation potential of one phase is supplied to the grid 118 of reactance tube 112 as in Fig. 3. Here, however, the compensating modulation potential is supplied (as in Fig. 1C) to the grid 113 of a tube 111 the anode of which is connected to the anode 92 of tube 90 and to a common plate potential supply choke 117. In this manner, the oscillator tube 90 is plate-modulated in a direction to oppose undesired amplitude modulation thereof during the frequency modulation process accomplished by the reactance tube 112.

The circuit of Fig. 4 is similar to that of Fig. 3 except for the method of obtaining compensating or balancing voltage to apply to the grid 49 of amplifier tube 50. Here, as in the phase modulator system of Fig. 2, the amplitude modulation on the signal is detected in rectifier 80 and this detected audio voltage is applied across potentiometer resistance 70' and from 70' a voltage is impressed on the grid 49 of tube 50 and used for compensation. In Fig. 4, the detector tube 80 is transformer-coupled by the windings of circuits 55 and 58 to the amplifier tube 50 and the detected audio voltage filtered in circuit 81 to remove radio-frequency components is fed to potentiometer 70'.

The modulator of Fig. 4 may be modified as shown in Fig. 4A. In this modification, tube 111 has its grid 113 coupled to a point on resistance 70' to be excited by the compensation control potential. Tube 111 amplifies the control potential and derives its plate current from choke 117 which also supplies plate current to the plate of the oscillator tube 90. The oscillator is plate-modulated to amplitude modulate the oscillations in a direction to compensate amplitude modulation thereof in an undesired manner during the frequency modulation process.

What is claimed is:

1. The method of modulating the length of wave energy in accordance with control potentials and of compensating for or cancelling out any undesired amplitude modulation of said wave energy accomplished during said wave length modulation process which includes the steps of, producing wave energy of carrier wave frequency, modulating the wave length of said produced wave energy in accordance with signalling potentials, multiplying the frequency of said wave length modulated wave energy and modulating the amplitude of the wave energy of multiplied frequency in a sense to compensate any undesired amplitude modulations thereon.

2. In a wave length modulation system, a source of wave energy the wave length of which is to be modulated, a plurality of electron discharge devices each having electrodes connected in alternating-current circuits wherein carrier wave energy to be modulated is caused to flow, an output circuit, means coupling said devices in cascade relation between said source of wave energy and output circuit, a reactance tube having two electrodes coupled to one of said alternating-current circuits and a control electrode coupled by phase shifting means to said alternating current circuits, and means for modulating the impedance of one of said devices and said tube in accordance with modulating potentials.

3. In a wave length modulation system, a source of wave energy the wave length of which is to be modulated in frequency in accordance with modulating potentials and the amplitude of which may be modulated in an undesired manner during said wave length modulation process, means excited by said modulating potentials for modulating the wave length of said wave energy in accordance with said modulating potentials, an electron discharge tube having input electrodes coupled to said source of wave energy and having output electrodes coupled to a utilization circuit, and means for modulating the impedance of said tube in accordance with said modulating potentials and in a phase with respect to the modulating potentials used to wave length modulate said wave energy to cancel out undesired amplitude modulation of said wave energy.

4. In a wave length modulation system, a source of wave energy the wave length of which is to be modulated in frequency in accordance with signal potentials and the amplitude of which may be modulated in an undesired manner during said wave length modulation process, means for modulating the wave length of said wave energy in accordance with modulating potentials, a frequency multiplier tube having input electrodes excited by said wave energy and having output electrodes coupled to a utilization circuit, and means for modulating the impedance of said frequency multiplier tube in accordance with said modulating potentials and in a sense to compensate for undesired amplitude modulation of said wave energy.

5. In a phase modulation system, a source of wave energy of substantially constant frequency, an electron discharge device having input electrodes coupled to said source, and having output electrodes, a second electron discharge device having input electrodes coupled with the output electrodes of said first named device and output electrodes coupled with a utilization circuit, a reactance tube having two electrodes coupled in shunt to electrodes of one of said devices, and having two electrodes excited by voltages of said generated frequency in phase displaced relation to cause said reactance tube to provide a variable reactance included in circuit with the electrodes of said one of said devices, and means for modulating the potential of an electrode of said reactance tube and an electrode of one of said devices in accordance with signals.

6. In a phase modulation system, a source of wave energy of substantially constant frequency, an electron discharge device having input electrodes coupled to said source, and having output electrodes, a second electron discharge device having input electrodes coupled with the output electrodes of said first device and output electrodes coupled with a utilization circuit, a reactance tube having two electrodes coupled in shunt to electrodes of said first device and having two electrodes excited by voltages of said generated frequency in phase displaced relation to cause said reactance tube to provide a variable reactance included in circuit with the electrodes of said first device, and means for modulating the potential on an electrode of said reactance tube and on an electrode of said second device in accordance with signals.

7. In a timing modulation system, an output circuit, a tuned circuit wherein wave energy the timing of which is to be modulated flows, the tuning of said circuit controlling in part the timing of said wave energy, an electron discharge tube having input electrodes coupled to said tuned circuit and having output electrodes, a second tube having input electrodes coupled with the output electrodes of said first named tube and having output electrodes coupled with said output circuit, a reactance tube having two electrodes coupled in shunt to said tuned circuit and having two electrodes excited by voltages of said wave energy in phase displaced relation to cause said reactance tube to provide a variable reactance in said tuned circuit, and circuits for applying modulating potentials to an electrode of said reactance tube and an electrode of said second named tube.

ROBERT E. SCHOCK.